United States Patent
Erick

(10) Patent No.: US 6,767,395 B2
(45) Date of Patent: Jul. 27, 2004

(54) LIQUID ALUMINUM STOP LEAK

(75) Inventor: Douglas Erick, Dunkirk, NY (US)

(73) Assignee: Crescent Marketing, Inc., Eden, NY (US)

( * ) Notice: Subject to any disclaimer, the term of this patent is extended or adjusted under 35 U.S.C. 154(b) by 0 days.

(21) Appl. No.: 10/246,440

(22) Filed: Sep. 18, 2002

(65) Prior Publication Data

US 2003/0056691 A1 Mar. 27, 2003

Related U.S. Application Data

(60) Provisional application No. 60/323,653, filed on Sep. 20, 2001.

(51) Int. Cl.$^7$ ................................................ C09K 3/12
(52) U.S. Cl. ................................. 106/33; 252/72
(58) Field of Search .............................. 106/33, 163.01, 106/164.5, 164.51, 200.1, 202.1, 204.01, 204.3, 404, 415; 252/72

(56) References Cited

U.S. PATENT DOCUMENTS

| | | |
|---|---|---|
| 1,377,275 A | 5/1921 | Ray |
| 1,648,866 A | 11/1927 | Ray |
| 1,722,437 A | 7/1929 | Meneray |
| 3,692,549 A | 9/1972 | Martin |
| 4,524,159 A | 6/1985 | Barber |
| 4,765,629 A | 8/1988 | Barks |
| 4,765,630 A | 8/1988 | Barks |
| 4,973,360 A | 11/1990 | Satas |
| 5,282,895 A | 2/1994 | Phillips |
| 5,391,224 A | 2/1995 | Pasuit et al. |
| 6,159,276 A | 12/2000 | Barks |

*Primary Examiner*—Michael Marcheschi
(74) *Attorney, Agent, or Firm*—Hodgson Russ LLP

(57) ABSTRACT

A liquid aluminum stop leak usable in aluminum radiators, aluminum engine blocks, and aluminum heat transfer systems for stopping leaks of coolant therefrom. A liquid aluminum stop leak comprising: water; a preservative; $CH_2OH$; cellulose; polyester; aluminum flakes; a compound for maintaining a suspension, and compounds for adjusting the pH level of the blend. The liquid aluminum stop leak is compatible with aluminum cooling systems preventing galvanic decay.

19 Claims, No Drawings

LIQUID ALUMINUM STOP LEAK

CLAIM OF PRIORITY

This application claims the benefit of U.S. provisional patent application Serial No. 60/323,653, filed on Sep. 20, 2001.

FIELD

The liquid aluminum stop leak is directed towards blends used for stopping leaks in systems in which liquids are present.

BACKGROUND

A reciprocating internal combustion engine draws a fuel air mixture into each of its cylinders, compresses the mix with a piston, and then ignites the mix with a spark from a spark plug. A crankshaft, connected to the piston, rotates as the controlled explosions in the cylinders cause the pistons repeatedly go up and down. From there, the rotational energy from the crankshaft may be transmitted as desired to accomplish various tasks, for example, turning the wheels on a vehicle. However, a byproduct of combustion is heat energy, and this heat energy has to be removed from the engine in short order to prevent engine damage, which may include engine seizure and engine block warping.

To cool a liquid cooled engine, therefore, engines blocks are provided with flow paths through which coolant circulates to keep the cylinders cool. The coolant circulates around the cylinders and through engine block flow path by way of a pump. The coolant eventually reaches a radiator (heat exchanger) where the hot coolant is cooled as it passes through the radiator. The radiator itself comprises many flow tubes with fins extending therefrom. Cool air is blown by a fan over the fins removing heat energy from the coolant. The coolant, now cooled, again circulates through the engine block flow paths and around the cylinders to absorb heat energy.

A typical coolant used in engine cooling systems comprises an antifreeze (ethylene glycol) in a one to one ratio mix with water.

In the past radiators were almost exclusively made of copper, but today a majority of radiators are made of aluminum and aluminum alloys. Some of the reasons for this are because of aluminum's properties, namely, its light weight, its strength, and its thermal properties. Nevertheless, one of the problems frequently encountered in any liquid coolant based system is that over time, leaks may develop in the radiator and/or engine block, causing the coolant to leak. There are numerous problems associated such leaks, including increasing the likelihood of the engine overheating. Additionally, if all the coolant leaks out, and the engine continues to run, eventually the engine becomes so hot it may seize. If this happens, the engine block and engine parts and components warp upon cooling, and the engine is ruined. Another problem associated with leaking cooling systems is environmental damage.

In the face of these problems, past attempts to stop leaks in aluminum cooling systems included adding a copper based stop leak (sealer) to the coolant. Indeed, many of the stop leak sealers presently sold are copper blends formulated for stopping leaks in "old technology" copper based radiator systems. These stop leaks typically include copper metal flakes to plug leaks.

However, copper based stop leaks are incompatible with the modern aluminum radiators and aluminum engine blocks currently used in most new automobiles. Indeed, a copper based stop leak, if used in a cooling system having an aluminum radiator and engine block, can actually weaken the aluminum radiator/engine block over time, because dissimilar metals (copper and aluminum) cause the galvanic decay of the radiator/engine block. Galvanic decay occurs when two different metals contact one another in the presence of an electrolyte. Thus, present copper based stop leaks, although suitable for copper radiators, are of little use in cooling systems having aluminum radiators and aluminum engine blocks, because they can cause galvanic decay of the aluminum.

Hence, there is a great need for an effective stop leak that is compatible with current aluminum based cooling systems, radiators, and engine blocks.

SUMMARY

The solution to the problem of leaking aluminum radiators and engine blocks is a new liquid aluminum radiator stop leak and liquid aluminum engine block stop leak, each of which overcomes the problems associated with the copper based stop leaks of the past. The liquid aluminum stop leak of the invention comprises a plurality of embodiments all of which are able to stop leaks of varying magnitude in aluminum based cooling systems. The liquid aluminum stop leak provides many advances, for example, in one embodiment, the liquid aluminum stop leak can stop leaks in leaky aluminum radiators, and in yet another embodiment, it can stop leaks in leaky aluminum engine blocks. Another advantage of the liquid aluminum stop leak is that it may be readily deployed in aluminum based cooling systems without concern that galvanic decay will corrode the aluminum.

In one embodiment, the liquid aluminum radiator stop leak remains suspended in the coolant. This is advantageous, as the user does not need to flush it out of the radiator or cooling system after it is added to the cooling system. In other words, the liquid aluminum radiator stop leak will never obstruct flow paths in the radiator or engine block. This results in monetary savings, as the radiator does not need to be flushed after the liquid aluminum radiator stop leak is added, thus no new coolant needs to be purchased and there are no disposal fees.

The liquid aluminum engine block stop leak of the other embodiment, on the other hand, effectively stops leaks in aluminum engine blocks and other leaks in the system that are too large for the liquid aluminum radiator stop leak to seal. The liquid aluminum engine block stop leak comprises sodium silicate (liquid glass) as well as antifoaming agents. The addition of sodium silicate to the liquid aluminum engine block stop leak is a superior advance, because it is able to stop large leaks that cannot be otherwise plugged. The cooling system is flushed after using the liquid aluminum stop leak with sodium silicate blend, so that clumping of the sodium silicate does not obstruct the flow paths in the radiator and engine block.

In the first embodiment, the liquid aluminum stop leak comprises: water; polyacrylic acid; 1,3-Di(hydroxymethyl)-5,5-dimethyl-2,4-imidazolidinedione; $CH_2OH$; cellulose; polyester; pigment; glitter; aluminum flakes; $((Mg,Al)_2Si_4O_{10}(OH)2)$; 2,2' Iminodiethanol 2,2',2" Nitrilotriethanol; and 2,2'-Iminodiethanol.

It is noted that the 1,3-Di(hydroxymethyl)-5,5-dimethyl-2,4-imidazolidinedione is also know as Dantogard; 1,3-hydroxymethyl-5,,5-Dimethylhydantoin; DMDM Hydantoin; and 1,3-Dimethylol-5,5-dimethylhydantoin. It is further noted that the 2,2'-Iminodiethanol is also known as diethanolamine.

Thus, a first embodiment calls for a liquid aluminum stop leak comprising:
a) water,
b) polyacrylic acid,
c) 1,3-Di(hydroxymethyl)-5,5-dimethyl-2,4-imidazolidinedione,
d) $CH_2OH$,
e) cellulose,
f) polyester,
g) aluminum flakes,
h) $((Mg,Al)2Si_4O_{10}(OH)2)$, and
i) 2,2'Iminodiethonaol 2,2',2" Nitrilotriethanol.

In another embodiment, the liquid aluminum stop leak comprises: water; sodium dioctyl sulfosuccinate; a water-dilutable, 30 percent active silicone emulsion; $((Mg,Al)2Si_4O_{10}(OH)2)$; cellulose; aluminum flakes; polyester; $Na_4O_4Si$; and a silver white luster glitter having particles sized between 45–500 microns and black mica.

Thus this embodiment of the stop leak calls for:
a) water,
b) sodium dioctyl sulfosuccinate,
c) a water-dilutable, 30 percent active silicone emulsion,
d) $((Mg,Al)2Si_4O_{10}(OH)2)$,
e) cellulose,
f) aluminum flakes,
g) polyester,
h) $Na_4O_4Si$, and
i) a silver white luster glitter having particles sized between 45–500 microns and black mica for making the stop leak easily visible.

Also disclosed are methods of making the aluminum stop leaks of the invention herein.

The liquid aluminum radiator stop leak and liquid aluminum engine block stop leak thus provide a novel solution for stopping leaks in aluminum based cooling systems, without causing the galvanic corrosion of the aluminum radiator or aluminum engine block. These and other advances of the liquid aluminum stop leak blends are more fully described in the detailed description.

DETAILED DESCRIPTION

The liquid aluminum stop leak is a blend of materials used to plug leaks in aluminum based cooling and heating systems. The terms aluminum based and aluminum based systems comprise systems wherein aluminum metal and alloys are used in the system. The blend itself is prepared according to whether a liquid aluminum radiator stop leak is called for (radiator leaks and small leaks), or whether a liquid aluminum engine block stop leak is called for (larger leaks—engine block leaks). There are a plurality of embodiments for either of the above, as described presently in Examples 1 through 4. A significant advantage of the any of the blends is that galvanic decay does not occur when used in aluminum based cooling systems or in association with aluminum engine blocks. The liquid aluminum radiator stop leak blend is described first, followed by a description of the liquid aluminum engine block stop leak.

With respect to the examples:
a) examples 1 and 2 describe the liquid aluminum radiator stop leak, and
b) examples 3 and 4 describe the liquid aluminum engine block stop leak.

Furthermore, once information pertaining to a material's composition and source are described, that description is not repeated for each subsequent example. Lastly, all the terminology found in the tables is fully described in the description which is presented after TABLE 1 and after TABLE 2.

Turning now to the liquid aluminum radiator stop leak, this stop leak is a novel blend of materials that stops leaks in aluminum radiators, without causing galvanic decay inside the aluminum radiator because like materials are working side by side with one another. One advantage of the liquid aluminum radiator stop leak blend is that it stays suspended in the coolant, so the user does not need to flush the radiator after adding it to the cooling system. Additionally, the liquid aluminum radiator stop leak also stops small leaks in the engine block and other parts of the cooling system if and when it encounters them as it circulates through the cooling system.

EXAMPLE 1

Example 1 illustrates an embodiment of the blend and the preparation of one gallon of the liquid aluminum radiator stop leak. Example amounts of the stop leak are also presented in TABLE 1 to show a gallon of the stop leak. TABLE 1 shows the composition of the blend, and following table 1 is a description of the components followed by a description of the method for blending the stop leak formulation.

TABLE 1

LIQUID ALUMINUM RADIATOR STOP LEAK

| | | | |
|---|---|---|---|
| Weight per Gallon | 8.627 lbs | | |
| Calculated weight per Gallon | 8.627 lbs | | |
| P.P.E. Glasses and Gloves | | | |

| 10 Components | Specific Gravity | Percentage Weight ranges | LBS. Example Amounts | Gallons Example Amounts |
|---|---|---|---|---|
| Water | 1.000 | 86.38 to 96.87 | 7.967 | 0.955 |
| Carbopol 940 (Polyacrylic Acid) | | 0.08 to 0.12 | 0.007 | |
| Dantogard (defined in description) | 1.100 | 0.10 to 0.20 | 0.009 | 0.001 |
| $CH_2OH$ (methanol) | 0.791 | 0.50 to 6.0 | 0.259 | 0.039 |
| Polyester 125 WPF | | 0.40 to 0.80 | 0.060 | |
| Kayocel 1W100. (defined in description) | | 1.00 to 2.00 | 0.155 | |
| Kayocel 6W100 (defined in description) | | 0.50 to 1.00 | 0.069 | |
| Cosmetic Pigment | | 0.05 to 0.10 | 0.005 | |
| Cosmetic Glitter | | 0.10 to 0.80 | 0.030 | |
| Aluminum Flake | 1.000 | 0.00 to 0.80 | 0.009 | 0.001 |
| Veegum K $((Mg,Al)2Si_4O_{10}(OH)2)$ | | 0.10 to 0.90 | 0.009 | |
| TEA 85 (defined in description) | 1.126 | 0.30 to 0.90 | 0.034 | 0.004 |
| Total | 1.033 | 100.00 | 8.622 | 1.000 |

Turning now to the particulars of TABLE 1, a description of the materials set forth therein is presented first, and for the sake of convenience, the sources from which these materials are obtainable. The procedural steps for mixing the blend are then set forth. Also, P.P.E. is the abbreviation for personal protection equipment.

The list begins with Carbopol 940. This material is a polyacrylic acid and is readily available from many sources. The polyacrylic acid aids both maintaining the stop leak in suspension to increase shelf life and thickening the stop leak. Carbopol is a registered trademark of the B. F. Goodrich Company, 3925 Embassy Parkway, New York, N.Y.

Dantogard is a preservative and is available from Lonza Inc., 17-17 Route 208, Fair Lawn N.J. 07410, phone number 1.800.777.1875. Dantogard is known by the chemical names 1,3-(hydroxymethyl)-5,5-Dimethylhydantoin; DMDM Hydantoin; 1,3-Dimethylol-5,5-dimethylhydantoin; or 1,3-Di(hydroxymethyl)-5,5-dimethyl-2,4-imidazolidinedione.

Methanol is readily available from many sources and has the chemical formula $CH_2OH$. Methanol acts as a freezing point (temperature) depressant of the stop leak so that the stop leak is useable in cold environments.

Polyester 125 WPF is a white polyester flock in the form a fibrous flock comprising a weight of about 6 pounds per cubic foot and comprising a bulk density of about 330–360 mililiters/gram. Also, the fiber length is about 2000–4000 microns and the fiber width is about 20–30 microns. The flock acts as a netting over the hole or opening causing the leak and aids in plugging the hole. This flock may be obtained from International Fiber Corporation, 50 Bridge Street, North Tonawanda, N.Y. 14120, phone number 1.888.698.1936, fax number 1.716.693.3528.

Kayocel 1W100 and Kayocel 6W100 also aid in plugging the leak, and are available from American Fillers and Abrasives, Inc., 150 Industrial Park Road, Bangor Mich. 49013, phone number 1.888.427.7950, fax number 1.616.427.5171. Kayocel 1W100 comprises 100 percent cellulose, and is in the form of pulp fibers 0.075 millimeters (75 micron) in length. Kayocel 6W100 comprises 100 percent cellulose, and is in the form of pulp fibers 0.3 millimeters (300 microns) in length. These fibers have a high degree of fibrillation of the pulp, which causes branches of the fiber to entangle, and this increases both the strength and cohesion of the fibers and the plugging ability of the fibers.

The Veegum K aids in causing the liquid aluminum radiator stop leak to remain suspended in the coolant. Veegum K is a trademark of and available from R.T. Vanderbilt Company, Inc., located at 30 Winfield Street, P.O. Box 5150, Norwalk Conn., 08858–5150, phone number 1.203.853.1400, www.rtvanderbilt.com. Veegum K is sold as granules having a whitish appearance. The composition of the Veegum K is magnesium aluminum silicate which provides for good suspension and low viscosity. The Veegum K and has chemical formula of $((Mg,Al)2Si_4O_{10}(OH)2)$.

The aluminum flakes assist in plugging the hole and are compatible with aluminum systems as they will not cause galvanic decay.

TEA 85 provides pH adjustment, and is an ethanolamine and in particular a blend of 85% TEA and 15% DEA. The chemical name for TEA is 2,2',2" Nitrilotriethanol. DEA is an ethanolamine and has the chemical name 2,2'-Iminodiethanol (Diethanolamine). TEA 85 is available from INEOS LLC., 400 West Sam Houston Parkway South, Houston Tex., 77042, phone number 1.866.865.4767, fax number 1.225.685.0057. The TEA 85, which includes DEA acts to adjust the pH level of the stop leak and thicken the stop leak.

The liquid aluminum radiator sealant also comprises a cosmetic glitter and a pigment, both of which are available from EM Industries, Inc., 7 Skyline Drive, Hawthorne, N.Y. 10532, phone number 1.914.592.4660, fax number 1.914.785.5815. The glitter is sold under the trademark Afflair 183. The Afflair 183 is a shimmering pearl, silver-white luster glitter having particles sized between about 45–500 microns. The glitter is employed so that the stop leak is observable.

The pigment is sold under the trademark Afflair 600 black mica. The black mica pigment provides for a background to accent the glitter and aluminum. Additionally, the cosmetic glitter and pigment serve to allow the user to see the blend after it is added to the radiator, making the liquid aluminum radiator stop leak easily detectible so that it may be easily cleaned up if spilled and easily distinguishable from other liquid blends and mixes.

The steps for blending the liquid aluminum radiator stop leak from the materials in the quantities described and set forth in TABLE 1 are as follows:

1) warming the water to a temperature of about 30 degrees Celsius,
2) adding the polyacrylic acid to the warm water and blending until uniform,
3) while blending, adding the 1,3-Di(hydroxymethyl)-5,5-dimethyl-2,4-imidazolidinedione, methanol, and 100 percent cellulose and pulp fibers 0.075 millimeters (75 micron) in length and 0.3 millimeters (300 microns) in length, and polyester fibers of between about 0.2 and 0.4 millimeters in length,
4) slowly blending for ten minutes, and slowly adding the (Veegum K) and aluminum flakes,
5) slowly blending in the silver white luster glitter comprising particles sized between about 45–500 microns and the black mica pigment, without over-blending so as to avoid damaging these materials due to shearing forces, and
6) blending in the 2,2' Iminodiethonaol and 2,2',2" Nitrilotriethanol without over mixing.

After blending, the liquid aluminum radiator stop leak is ready for an application in which a leaky aluminum radiator needs to be sealed. Treatment of the radiator is performed by adding the mixture directly to the coolant system/radiator. A cooling system treated with this liquid aluminum radiator sealer does not need to be flushed after treatment, because the liquid aluminum radiator stop leak remains in a suspended state, that is it is a mix of fine particles supported by buoyancy and the particles do not settle. This results in savings of both time and resources, as no new coolant needs to be added to the cooling system and there are no antifreeze disposal problems.

EXAMPLE 2

Example 2 is an embodiment of the blend similar to Example 1, with the modification of adding specially coated aluminum flakes as a substitute for or in addition to some of the shimmering pearl Afflair 183. The aluminum flakes are named "Aqua Safe Aluminum Paste #4300nl-WW" and are available from Edgmont Metallic Pigment Inc., 203 Garfield Avenue, West Chester, Pa., 19380, phone number 1.888.334.6668 or 1.610.429.1345, and fax number 1.610.429.4457. The coated aluminum flakes are in the form of a non-leafing aluminum paste comprising a particle size of about 32 microns and a metal content of about 60%. The aluminum flakes reinforce the fiber plug that forms and plugs holes in the radiator with a compatible metal. The coating on these aluminum flakes prevents gassing which is a chemical reaction when water contacts aluminum. In the case of a radiator, the undesirable gassing is limited/preventable if the aluminum is coated. Use of the blends of Examples 1 and 2 is easy for the user, as the user need only add the blend to the system. Then the fibers (cellulose, polyester, etc.) in the blend enter any holes in the cooling system and plug the holes. This is because the fibers are sized, as described above, to fill small holes in short order.

EXAMPLE 3

Example 3 illustrates an embodiment of the composition and preparation of one gallon blend of the liquid aluminum engine block stop leak. This blend is shown in detail in TABLE 2 and includes sodium silicate $Na_4O_4Si$ (also known as water glass, liquid glass, and/or sodium silicate glass). Table 2 also shows example amounts of the stop leak for one gallon of the stop leak. Sodium silicate has the ability to seal large leaks that emanate from large openings, even cracks in the engine block. It is well suited to sealing leaks that the above described the liquid aluminum radiator sealer might not be able to seal. The sodium silicate, which hardens at about 150°–190° Fahrenheit (66°–88° Celsius) flows into and between the fibers of polyester and cellulose that are plugging the hole, and sets and dries due to the heated radiator forming a solid seal, thus plugging the leak. However, because the excess sodium silicate (the sodium silicate not used to plug the holes) will eventually clump and obstruct coolant flow paths in the radiator and engine, the cooling system is flushed shortly after treatment with the application and use of this blend.

TABLE 2

LIQUID ALUMINUM ENGINE BLOCK STOP LEAK

| Components | Specific Gravity | Percentage Weight range | Lbs. Example Amounts | Gallons Example Amounts |
|---|---|---|---|---|
| Weight per Gallon | | 10.1759 lbs. | | |
| Calculated weight per gallon | | 10.1759 lbs. | | |
| P.P.E. Glasses and Gloves | | | | |
| Warm Water | 1.000 | 29.92 to 48.46 | 3.703 | 0.444 |
| Veegum K ((Mg,Al)2Si4O10(OH)2) | | 0.50 to 1.00 | 0.061 | |
| $CH_3OH$ (methanol) | 0.791 | 0.50 to 6.00 | 0.305 | 0.046 |
| Polyester 125 WPF | | 0.10 to 0.40 | 0.010 | |
| Kayocel 1W100 | | 0.10 to 0.40 | 0.020 | |
| Kayocel 6W100 | | 0.10 to 0.40 | 0.025 | |
| Cosmetic Pigment | | 0.05 to 0.10 | 0.006 | |
| Cosmetic Glitter | | 0.10 to 0.80 | 0.036 | |
| Emcol 4575 PG | 1.100 | 0.05 to 0.08 | 0.006 | 0.001 |
| Antifoam DC Y-30 | 0.986 | 0.04 to 0.08 | 0.005 | 0.001 |
| Sodium Silicate ($Na_4O_4Si$) | 1.400 | 50.00 to 60.00 | 5.902 | 0.505 |
| TOTALS | 1.219 | 100.00 | 10.176 | 1.000 |

Turning now to the particulars of TABLE 2, many of the materials and the sources from which they are obtainable are already set forth in the description relative to TABLE 1. As such, these previously described materials will not be repeated and only materials not previously described are presently set forth below.

Emcol 4575 PG is a wetting agent which decreases surface tension and has the chemical name sodium dioctyl sulfosuccinate. It is available from Witco Corp, 3200 Brookfield Street, Houston, Tex., 77145, phone number 1.713.433.7281, which can also be contacted at the alternative address One America Way, Greenwich, Conn., 06831, phone number 1.203.522.2000, fax number 1.203.552.2010. The Emcol 4575 PG is added to decrease surface tension and to provide for better wetting.

The antifoaming agent Antifoam DC Y-30 is available from Dow Corning, headquartered at 3100 James Savage Road, P.O. Box 994, Midland, Mich., 48686, phone number 1.517;496.5369, and fax number 517.496.4688. This antifoaming agent is a water-dilutable, 30 percent active silicone emulsion that is designed to control foam in aqueous systems and it is particularly useful in coolant/antifreeze systems.

The sodium silicate ($Na_4O_4Si$) is a corrosion inhibitor, and is available from Occidental Chemical Corp., Occidental Tower, 5005 LBJ Freeway, Dallas, Tex., 75244, phone number 1.800.752.5151.

The steps to prepare the liquid aluminum engine block stop leak are similar to the in steps described in the previous examples. In particular, the above materials are blended in the quantities described and set forth in TABLE 2 as follows:

1) warming the water to a temperature of about 30 degrees Celsius,
2) adding the sodium dioctyl sulfosuccinate and the water-dilutable, 30 percent active silicone emulsion to the warmed water and blending briefly,
3) adding the ((Mg,Al)2Si$_4$O$_{10}$(OH)2) and blending until uniform (about thirty minutes),
4) slowly adding the 100 percent cellulose and pulp fibers of about 0.075 millimeters (75 micron) in length and about 0.3 millimeters (300 microns) in length, and polyester fibers of between about 0.2 and 0.4 millimeters in length, and blending in the methanol,
5) slowly blending and adding the aluminum flakes to the mixture,
6) slowly blending in the silver white luster glitters comprising particles sized between about 45–500 microns and blending in the black pigment, without over-blend so as to avoid damaging these materials by high shear, and
7) slowly adding the Sodium Silicate ($Na_4O_4Si$) and blending for 5 minutes.

To use the liquid aluminum engine block stop leak, first the blend is added to the cooling system. The blend is allowed to circulate in the cooling system until the engine block leak stops. The leak will stop as the liquid aluminum stop leak enters holes and plugs them. Then, the cooling system is drained and flushed to clean out the stop leak therefrom. Since flushing removes the blend from the cooling system, no undesirable obstructions form in the flow paths in the cooling system.

EXAMPLE 4

Example 4 is an embodiment of the blend similar to that of Example 3, with the modification of blending in specially coated aluminum flakes (aluminum metallic pigment), used as a substitute for or in addition to some of the shimmering pearl Afflair 183 (the silver white glitter comprising particles sized between about 45 microns to 500 microns).

The specially coated aluminum flakes are in the form of a water soluble non-leafing aluminum paste having a particle size of about 32 microns and a metal content of about 60%. These specially coated aluminum flakes are coated to prevent reactions (gassing) between the aluminum and water, otherwise hydrogen gas would be liberated which could potentially limit the shelf life of the product. These specially coated aluminum flakes serve to reinforce the fiber plug that forms in the vicinity of the leak with a compatible metal, namely aluminum. This metallic pigment is available from Edgmont Metallic Pigment Inc., 203 Garfield Avenue, West Chester, Pa., 19380, phone number 1.888.334.6668 or 1.610.429.1345, and fax number 1.610.429.4457.

Thus, the liquid aluminum radiator stop leak and the liquid aluminum engine block stop leak provide a solution to the problem of leaky aluminum based cooling systems. Further, this is accomplished without galvanic decay problems, as the liquid aluminum stop leaks are compatible with aluminum radiators and engines. Further, the liquid aluminum radiator stop leak does not even need to be removed from the cooling system being treated, because the liquid aluminum radiator stop leak remains in suspension in the coolant. Finally, although the liquid aluminum engine block stop leak needs to be flushed from the cooling system, it is able to stop leaks that would otherwise be unsealable, or be very costly to seal. For example it can stop leaks which otherwise would require difficult and costly welding to seal.

It is to be kept in mind that the described embodiments of the liquid aluminum stop leak can be deployed successfully in most aluminum based cooling system, that is, liquid aluminum stop leak is not limited to stopping leaks in just automotive applications. Also, an aluminum based cooling system may be treated with both the liquid aluminum radiator stop leak and the liquid aluminum engine block stop leak in order to stop leaks. Further, since each of the stop leaks circulates through the cooling system, they will stop leaks regardless of where the leak is, be it radiator or engine block. In other words, in some instances, the liquid aluminum radiator stop leak may end up stopping smaller leaks in the engine block, and the liquid aluminum engine block stop leak may end up stopping larger leaks in the radiator.

It is to be understood that various changes in the materials, steps, and arrangements which have been described herein in detail and set forth in a plurality of examples in order to describe the nature of the liquid aluminum stop leak, may be made by those skilled in the art within the principles and scope of the liquid aluminum stop leak of this invention. While several embodiments of the liquid aluminum stop leak are described in detail, that is for purposes of illustration, not limitation.

What is claimed:

1. A liquid aluminum stop leak comprising:
   a) water in an amount of between about 86.38 to 96.87 by weight percent;
   b) polyacrylic acid in an amount of between about 0.08 and 0.12% by weight percent;
   c) 1,3-Di(hydroxymethyl)-5,5-dimethyl-2,4-imidazolidinedione in an amount of between about 0.1 and 0.2 weight percent;
   d) $CH_2OH$ in an amount of between about 0.5 and 6.0 by weight percent;
   e) cellulose fibers in an amount of between about 1.5 and 3.0 by weight percent;
   f) polyester fibers in an amount of between about 0.4 and 0.8 by weight percent;
   g) aluminum flakes in an amount of between about 0.0 and 0.8 by weight percent;
   h) a silver luster glitter in an amount of between about 0.1 and 0.8 by weight percent;
   i) a black mica pigment in an amount of between about 0.05 and 0.10 by weight percent;
   j) $(((Mg,Al)2Si_4O_{10}(OH)2)$ in an amount of between about 0.1 and 0.9 by weight percent; and
   k) a blend comprising 15 percent 2,2' Iminodiethonaol and 85 percent 2,2',2"Nitrilotriethanol in an amount of between about 0.3 and 0.9 by weight percent.

2. The liquid aluminum stop leak of claim 1 wherein the cellulose fibers comprise pulp fibers about 0.075 millimeters in length and the cellulose fibers further comprise pulp fibers about 0.3 millimeters in length and further wherein the polyester fibers comprise fibers about 0.3 millimeters in length.

3. The liquid aluminum stop leak of claim 1 wherein water soluble non-leafing coated aluminum particles comprising a size of about 32 microns and a metal content of about 60% are substitutable for some or all of the silver luster glitter, the coated aluminum particles are used for preventing reactions between the aluminum flakes and the water.

4. A method for making a liquid aluminum stop leak comprising the steps of:
   warming water;
   blending in a polyacrylic acid;
   blending in 1,3-Di (hydroxymethyl)-5,5-dimethyl-2,4-imidazolidinedione;
   blending in $CH_2OH$;
   blending in polyester fibers;
   blending in cellulose fibers; blending in aluminum flakes; blending in$((Mg,Al)2Si_4O_{10}(OH)2)$; blending in a silver white luster glitter comprising particles sized between about 45–500 microns; blending in a black mica; and blending in a blend of 2,2' Iminodiethonaol and 2,2',2" Nitrilotriethanol.

5. The method for making a liquid aluminum stop leak according to claim 4 wherein the step of blending in the cellulose fibers further comprises blending in pulp fibers about 0.075 millimeters in length and the step of blending in cellulose fibers further includes the step of blending in pulp fibers about 0.3 millimeters in length, and wherein the step of blending in polyester fibers further comprises blending in polyester fibers comprising a length of about 0.3 millimeters.

6. The method of making an aluminum stop leak according to claim 4 wherein water soluble non-leafing coated aluminum particles comprising a size of about 32 microns and a metal content of about 60% are substitutable for some or all of the silver white luster glitter, the water soluble non-leafing coated aluminum particles are used for preventing reactions between the aluminum flakes and the water.

7. A method of making a liquid aluminum stop leak comprising the steps of:
   a) warming water, wherein the water is in an amount between about 86.38 and 96.87% by weight of the liquid aluminum stop leak;
   b) blending in a polyacrylic acid in an amount of between about 0.08 and 0.12% by weight with the water;
   c) blending in 1,3-Di(hydroxymethyl)-5,5-dimethyl-2,4-imidazolidinedione in an amount between about 0.10 and 0.20% by weight;
   d) blending in $CH_2OH$, in an amount of about between about 0.50 and 6.00% by weight and cellulose in an amount of between about 1.50 and 3.00% by weight, and polyester in an amount of between about 0.40 and 0.80% by weight;

e) blending in aluminum flakes in an amount of between about 0.00 and 0.80% by weight;

f) blending in a silver luster glitter in an amount of between about 0.10 and 0.80%. by weight and a black mica pigment in an amount of between about 0.05 and 0.10% by weight;

g) blending in $((Mg,Al)2Si_4O_{10}(OH)2)$ in an amount of about between about 0.10 and 0.90% by weight; and h) blending in a blend comprising 85 percent 2,2',2" Nitrilotriethanol and 15 percent 2,2' Iminodiethanol in the combined amount of between about 0.30 and 0.90% by weight.

8. The method of making a liquid aluminum stop leak of claim 7 wherein the cellulose further comprises pulp fibers about 0.075 millimeters in length and further wherein the cellulose comprises pulp fibers about 0.3 millimeters in length, and the polyester comprises fibers of about 0.3 millimeters in length.

9. The method of making a liquid aluminum stop leak of claim 7 further wherein water soluble non-leafing coated aluminum particles comprising a size of about 32 microns and a metal content of about 60% are substitutable for some or all of the silver luster glitter, the water soluble non-leafing coated aluminum particles are used for preventing reactions between the aluminum flakes and the water.

10. A liquid aluminum engine block stop leak comprising:
a) water in an amount of between about 29.92 and 48.46% by weight;
b) sodium dioctyl sulfosuccinate in an amount of between about 0.50 and 1.00% by weight;
c) methanol in an amount of between about 0.50 to 6.0% by weight;
d) a water-dilutable, 30 percent active silicone emulsion in an amount of between about 0.40 and 0.10% by weight;
e) $((Mg,Al)2Si_4O_{10}(OH)2)$ in an amount of between about 0.5 and 1.00% by weight;
f) cellulose in an amount of between about 0.20 and 0.80% by weight and polyester fibers in an amount of about between about 0.10 and 0.40% by weight;
g) aluminum flakes in an amount of about between about 0.00 and 0.80 by weight;
h) a silver white luster glitter comprising particles sized between about 45–500 microns in an amount of between about 0.1 and 0.80% by weight and a black mica in an amount of between about 0.05 and 0.10% by weight, the silver white luster glitter and the black mica are used for making the stop leak visible; and
i) $Na_4O_4Si$ in an amount of between about 50.00 and 60.00% by weight.

11. The liquid aluminum stop leak of claim 10 wherein the cellulose comprises pulp fibers about 0.075 millimeters in length and are used for strengthening the liquid aluminum stop leak and further wherein the cellulose comprises pulp fibers about 0.3 millimeters in length and are used for strengthening the liquid aluminum stop leak and further wherein the polyester fibers comprise fibers of about 0.3 millimeters in length and are used for strengthening the liquid aluminum stop leak.

12. The liquid aluminum stop leak of claim 10 wherein water soluble non-leafing coated aluminum particles comprising a size of about 32 microns and a metal content of about 60% are substitutable for some or all of the silver white luster glitter, the water soluble non-leafing coated aluminum particles are used for preventing reactions between the aluminum flakes and the water.

13. A method for making a liquid aluminum engine block stop leak comprising the steps of:
a) providing and warming water;
b) blending in sodium dioctyl sulfosuccinate and a water-dilutable 30 percent active silicone emulsion;
c) blending in methanol;
d) blending in $((Mg,Al)2Si_4O_{10}(OH)2)$ until uniform;
e) blending in cellulose fibers, polyester fibers; and aluminum flakes;
f) blending in a silver white luster glitter comprising particles sized between 45–500 microns and blending in black mica; and
g) blending in sodium silicate.

14. The method of making a liquid aluminum engine block stop leak of claim 13 wherein the cellulose comprises pulp fibers of about 0.075 millimeters in length and are used for strengthening the liquid aluminum stop leak and further wherein the cellulose comprises pulp fibers about 0.3 millimeters in length and are used for strengthening the liquid aluminum stop leak and wherein the polyester fibers comprise a length of about 0.3 millimeters and are used for strengthening the liquid aluminum stop leak.

15. The method of making a liquid aluminum stop leak of claim 13 further wherein water soluble non-leafing coated aluminum particles comprising a size of about 32 microns and a metal content of about 60% are substitutable for some or all of the silver white luster glitter, the water soluble non-leafing coated aluminum particles are used for preventing reactions between the aluminum flakes and the water.

16. A liquid aluminum stop leak blend made by the process of:
warming water which is in an amount of between about 29.92 and 48.46% by weight of the stop leak;
blending in sodium dioctyl sulfosuccinate in an amount between about 0.05 and 0.08% by weight;
blending in a water-dilutable, 30% active silicone emulsion in an amount of between about 0.04 and 0.10% by weight;
blending in methanol in an amount of between about 0.50 to 6.0% by weight;
blending in $((Mg,Al)2Si_4O_{10}(OH)2)$ in an amount of between about 0.50 and 1.00% by weight;
blending in cellulose in an amount of between about 0.20 and 0.80% by weight, and blending in polyester in an amount of between about 0.10 and 0.40% by weight;
blending in aluminum flakes in an amount of between about 0.00 and 0.80% by weight;
blending in a silver white luster glitter comprising particles sized between 45–500 microns in an amount of between about 0.10 and 0.80% by weight; and
blending in a black mica in an amount of between about 0.05 and 0.10% by weight, the silver white luster glitter and black mica are used for making the stop leak easily visible, and blending in $Na_4O_4Si$ in an amount of between about 50.00 and 60.00% by weight.

17. The liquid aluminum stop leak of claim 16 wherein the cellulose comprises pulp fibers about 0.075 millimeters in length and are used for strengthening the liquid aluminum stop leak and further wherein the cellulose comprises pulp fibers about 0.3 millimeters in length and are used for strengthening the liquid aluminum stop leak and wherein the polyester comprises fibers having a length of about 0.3 millimeters and are used for strengthening the liquid aluminum stop leak.

18. The liquid aluminum stop leak of claim 16 further wherein water soluble non-leafing coated aluminum particles comprising a size of about 32 microns and a metal content of about 60% are substitutable for some or all of the silver white luster glitter, the water soluble non-leafing coated aluminum particles are used for preventing reactions between the aluminum flakes and the water.

19. A method of plugging a hole in an aluminum heating/cooling system comprising the steps of:

making a blend by warming water which is in an amount of between about 29.92 and 48.46% by weight of the blend;

blending in sodium dioctyl sulfosuccinate in an amount between about 0.05 and 0.08% by weight;

blending in a water-dilutable, 30% active silicone emulsion in an amount of between about 0.04 and 0.10% by weight;

blending in methanol in an amount of between about 0.50 to 6.0% by weight;

blending in $((Mg,Al)2Si_4O_{10}(OH)2)$ in an amount of between about 0.50 and 1.00% by weight;

blending in cellulose in an amount of between about 0.20 and 0.80% by weight, and blending in polyester in an amount of between about 0.10 and 0.40% by weight;

blending in aluminum flakes in an amount of between about 0.00 and 0.80% by weight;

blending in a silver white luster glitter comprising particles sized between 45–500 microns in an amount of between about 0.10 and 0.80% by weight; and blending in a black mica in an amount of between about 0.05 and 0.10% by weight, the silver white luster glitter and black mica are used for making the stop leak easily visible, and blending in $Na_4O_4Si$ in an amount of between about 50.00 and 60.00% by weight;

adding the blend to the aluminum heating/cooling system and circulating the blend through the aluminum heating/cooling system, and then flushing the aluminum heating/cooling system.

* * * * *